3,633,985

[72] Inventor Jacques M
 L'Hay-les-Roses, France
[21] Appl. No. 58,385
[22] Filed July 28, 1970
[45] Patented Jan. 11, 1972
[73] Assignee Compagnie Generale d'Electricite
 Paris, France
[32] Priority July 28, 1969
[33] France
[31] 6925748

[54] CONCENTRATION OBJECTIVE COMPOSED OF FOUR LENSES
 1 Claim, 3 Drawing Figs.
[52] U.S. Cl. ..................................... 350/2, 350/223
[51] Int. Cl. ...................................... G02b 9/34, G02b 13/14

........................................................ 350/2, 223

[56] References Cited
 UNITED STATES PATENTS
 2,622,479 12/1952 Bertele ...................... 350/223 X
 3,217,596 11/1965 Murray et al. ................ 350/2
 3,368,078 2/1968 Flint et al. ................... 350/2 X
 FOREIGN PATENTS
 1,088,382 10/1967 Great Britain ................ 350/2

*Primary Examiner*—John K. Corbin
*Attorney*—Sughrue, Rothwell, Mion, Zinn & Macpeak ABSTRACT: A concentration objective for focusing a parallel monochromatic beam of light is comprised of two groups of lenses having at least one convergent lens and at least one divergent lens in the first group and at least one concave-convex lens in the second group.

CONCENTRATION OBJECTIVE COMPOSED OF FOUR LENSES

The present invention concerns a concentrator objective for focusing substantially parallel monochromatic light beams such as laser beams. Such an objective is intended to concentrate all the luminous flux of the beam into a circle having as small a diameter as possible.

Concentrator objectives using a large number of lenses have already been proposed, for example the Ernostar and the R. Biotar. They comprise at least one group of divergent lenses and a group of concave-convex lenses.

These systems suffer certain disadvantages. A significant portion of the incident light flux is lost by absorption within the lenses and by reflection from the lens surfaces. The objectives are bulky, since the distances between the component lenses is often great in comparison with their focal lengths. Also, such objectives are liable to be damaged by the passage of a high-energy laser beam.

Theoretical considerations show that a single aspherical lens can provide perfect focusing, but the state of the art in this field does not as yet permit the production of an aspherical lens of the necessary quality.

In accordance with the invention there is provided a concentrator objective, comprising a first group of lenses including at least one converging lens and at least one diverging lens, and a concave-convex lens arranged with its aplanatic object point coinciding with the image of a point object at infinity given by the lenses of the first group, the successive lenses being separated by a nonzero distance which is small in relation to the smallest focal length of the lenses.

The invention will now be described in more detail, by way of example only, with reference to the accompanying diagrammatic drawings, in which.

Figure 1:
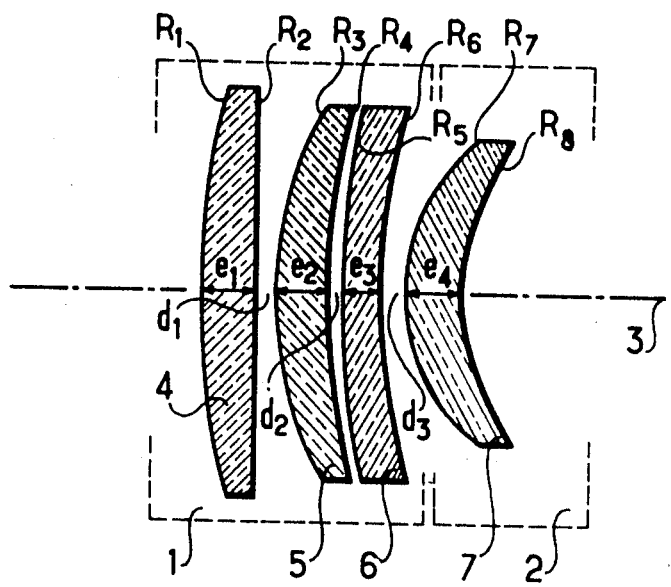
FIG. 1 is an axial section through a concentrator objective.

Referring to FIG. 1, the concentrating objective comprises a first group 1 of lenses upstream of a second group 2 which in this particular example contains only one lens. The lens groups 1 and 2 have a common optical axis 3.

The first group 1 includes two converging lenses 4 and 5 and a diverging lens 6. The ratio of the power of the diverging lens to that of the converging lenses is between 0.15 and 0.45. The power of the diverging lens, that is to say the reciprocal of its focal length, is preferably low.

The single lens 7 of the second group 2 is a concave-convex lens arranged with its aplanatic object point coinciding with the image of a point object at infinity given by the first lens group 1. When the second lens group 2 includes more than one concave-convex lens, the aplanatic image point of each lens coincides with the aplanatic object point of the adjacent lens downstream.

The distances between the lenses 4, 5, 6, and 7 are small in comparison with the smallest of their focal lengths. The lenses are not cemented together. The optical index of the glasses from which the lenses are made is as high as possible, and may be the same for all the lenses. A suitable value is of the order of 1.7.

At least some of the lenses may be provided, at their optical centers, with a hole extending along the optical axis 3, and either completely or only partially penetrating the lens.

The surfaces of at least some of the lenses may be given a dielectric antireflective coating.

A particular lens assembly, giving a focal length of 100 units and having a ratio of output aperture to focal length, of 1:0.9, using a glass of optical index 1.704 has the dimensions given in the following table, wherein $R_1$ to $R_8$ are the respective radii of curvature of the upstream and downstream faces of the lenses 4 to 7, $e_1$ to $e_4$ are their respective thicknesses, and $d_1$ to $d_3$ are the distances between them, as shown in FIG. 1:

| | | | |
|---|---|---|---|
| $R_1$ | +211,57 | $e_1$ | 16,70 |
| $R_2$ | infinity | $d_1$ | 5,0 |
| $R_3$ | +101,19 | $e_2$ | 16,70 |
| $R_4$ | +198,38 | $d_2$ | 5,0 |
| $R_5$ | +435,66 | $e_3$ | 11,69 |
| $R_6$ | +226,60 | $d_3$ | 5,0 |
| $R_7$ | +46,18 | $e_4$ | 16,70 |
| $R_8$ | +58,25 | | |

The units used in the table are arbitrary.

Using the present invention, it is possible to provide an objective of good quality which is not bulky and with which a high-energy substantially parallel monochromatic light beam, such as a laser beam, may be focused. It is possible to provide an image field of the order of a few degrees and an output aperture to focal length ratio of the order of 1. Correctness of the sphericity and the quality of the objective are shown by FIGS. 2 and 3, which apply to an objective of 64 millimeters focal length, with an output aperture to focal length ratio of 1:1 and used at a wavelength of 1.06 microns.

Figure 2:
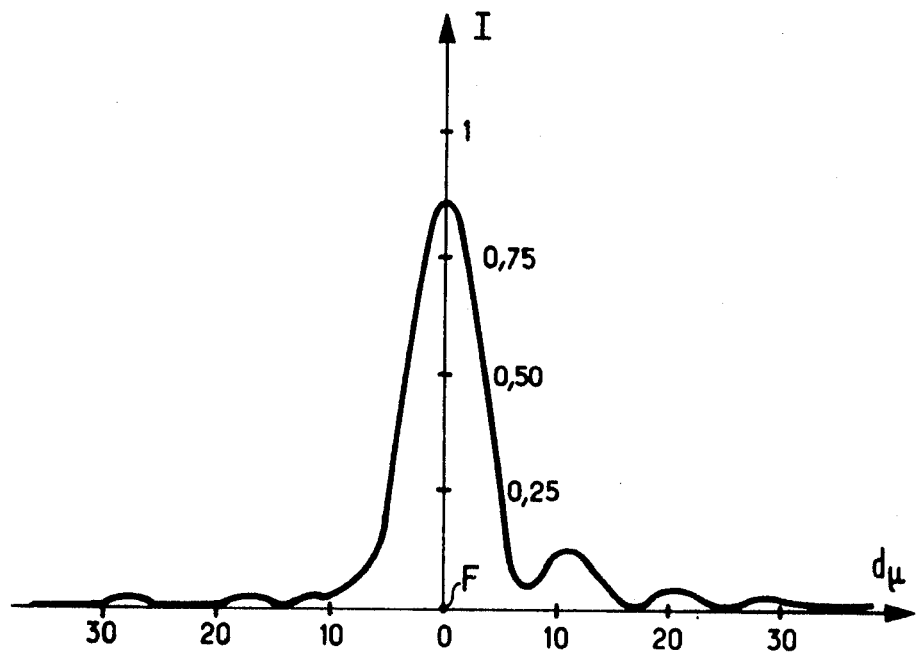
FIG. 2 shows the variations in luminous intensity on either side of the focus of the objective.

In FIG. 2, the luminous intensity I on either side of the focus F is shown as a function of the distance $d$ in microns along the optical axis. On the intensity axis, the FIG. 1 indicates the intensity that would be obtained with a perfect focusing device, in arbitrary units.

Figure 3:
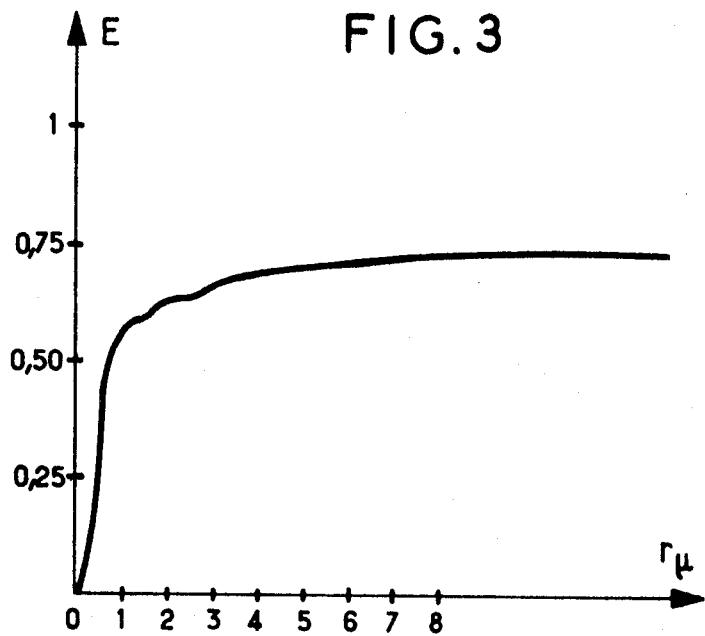
FIG. 3 shows the luminous energy contained in a circle of varying radius in the focal plane of the objective and centered on the focal point.

In FIG. 3 there is shown the luminous energy E, in arbitrary units, contained in a circle of radius $r$ microns, centered on the focus F and lying in the focal plane, for values of $r$ from 0 to 8.

What is claimed is:

1. A concentrator objective comprising a first group of lenses including first and second converging lenses and a single diverging lens and a second lens group including a single concave-convex lens, said concave-convex lens being arranged with its aplanatic object point coinciding with the image of a point object at infinity given by the lenses of the first group and the successive lenses being separated by a nonzero distance which is small in relation to the smallest focal length of the lenses wherein the dimensions and separations of the lenses are as follows:

| | | | |
|---|---|---|---|
| $R_1$ | +211,57 | $e_1$ | 16,70 |
| $R_2$ | infinity | $d_1$ | 5,0 |
| $R_3$ | +101,19 | $e_2$ | 16,70 |
| $R_4$ | +198,38 | $d_2$ | 5,0 |
| $R_5$ | +435,66 | $e_3$ | 11,69 |
| $R_6$ | +226,60 | $d_3$ | 5,0 |
| $R_7$ | +46,18 | $e_4$ | 16,70 |
| $R_8$ | +58,25 | | | where $R_1$ to $R_8$ are the upstream and downstream radii of curvature of the first and second converging lenses, the single diverging lens and the concave-convex lens respectively, $e_1$ to $e_4$ are their respective thicknesses on the optical axis, and $d_1$ to $d_3$ are the distances between them measured along the optical axis.

* * * * *